March 20, 1962     H. ZOLTOK     3,026,042
ENGINE COOLING AND VEHICLE HEATING AND VENTILATING UNIT
Filed June 29, 1959     3 Sheets-Sheet 1

INVENTOR: HARRY ZOLTOK
BY

HIS ATTORNEYS

March 20, 1962 H. ZOLTOK 3,026,042
ENGINE COOLING AND VEHICLE HEATING AND VENTILATING UNIT
Filed June 29, 1959 3 Sheets-Sheet 2

INVENTOR HARRY ZOLTOK
BY
HIS ATTORNEYS

INVENTOR HARRY ZOLTOK
BY

HIS ATTORNEYS

United States Patent Office 3,026,042
Patented Mar. 20, 1962

3,026,042
ENGINE COOLING AND VEHICLE HEATING
AND VENTILATING UNIT
Harry Zoltok, 790 South Drive, Fort Garry,
Manitoba, Canada
Filed June 29, 1959, Ser. No. 823,510
7 Claims. (Cl. 237—12.3)

My invention relates to new and useful improvements in engine cooling and vehicle heating and ventilating units specifically designed for use with passenger carrying vehicles such as motor coaches and buses. Furthermore, it is specifically designed for use with such vehicles having the engine situated at the rear of the vehicle.

Considerable difficulty has been experienced in the past in providing an efficient heating and ventilating unit for the interior of the coach and such heating normally takes the form of a plurality of front water heaters in the passenger compartment, each operated by electric heaters or, alternatively, consisting of individual heater cores together with tanks, water lines, electric motors, fans, etc., which may be connected to the cooling system of the engine.

This is an extremely awkward arrangement, inasmuch as some considerable time is required in order for the engine to heat all of the water in the individual heaters, the heat from which is then distributed by fan to the vehicle compartment.

Also, when operating in relatively cold climate, it is difficult to maintain the engine coolant up to the required operating temperature due to the extensive drain of heat by the relatively large volume of water or coolant required for the entire system.

Electric radiators with their associated fans or blowers are relatively impracticable for large passenger vehicles due to the extensive current drain and the difficulty of introducing fresh air to the interior of the coach which normally is sealed.

Both of these systems give considerable difficulty in cold climates due to the extensive fogging or freezing which occurs on the windows, even although such windows are normally provided with storm sashes.

I have overcome these disadvantages by providing a pair of radiators connected to the coolant system on the engine but being situated in a sealed compartment, each radiator having a tandem fan unit inboard thereof, one fan of which supplies air to the engine compartment and is used for cooling water in the radiator, and thereby cooling the engine, the other fan of which supplies warm air from the radiator to the interior of the passenger vehicle by means of ducting. The air flow through both of these fans is thermostatically controlled by pneumatic valves and as all air for the radiator is drawn from the exterior of the vehicle, a constant supply of fresh warm air can be supplied to the interior passenger portion of the vehicle. A further advantage, of course, is the fact that the interior of the passenger vehicle is thereby maintained slightly pressurized thus preventing any draft or the entry of dust.

The principal object and essence of my invention is, therefore, to provide a device of the character herewithin described which provides a constant supply of warm fresh air to the interior of the coach and which, at the same time, maintains the engine working temperature within the desired limit, all of which is provided without additional fluid capacity being required.

A further object of my invention is to provide a device of the character herewithin described which, due to the fact that the compartment carrying the radiator and fans is completely sealed from the engine compartment, prevents any possibility of engine fumes entering the passenger compartment.

Yet another object of my invention is to provide a device of the character herewithin described which includes means whereby fresh cool air can be introduced into the passenger compartment through the fan unit but being by-passed from the radiators in relatively warm weather. This is particularly important in hot, dusty climates as the passenger compartment remains pressurized thus preventing the ingress of dust.

A still further object of my invention is to provide a device of the character herewithin described which, due to the fact that it is situated adjacent the engine compartment, takes up far less space than conventional heaters which have to be situated in the passenger compartment.

A still further object of my invention is to provide a device of the character herewithin described in which the entire system is thermostatically controlled through the use of pneumatic diaphragm valves and the like.

With the foregoing objects in view, and such other objects and advantages as will become apparent to those skilled in the art to which this invention relates as this specification proceeds, my invention consists essentially in the arrangement and construction of parts all as hereinafter more particularly described, reference being had to the accompanying drawings in which:

FIGURE 3 is a top plan view of one side of my device, it being understood that the opposite side is similar.

In the drawings like characters of reference indicate corresponding parts in the different figures.

Figure 1:
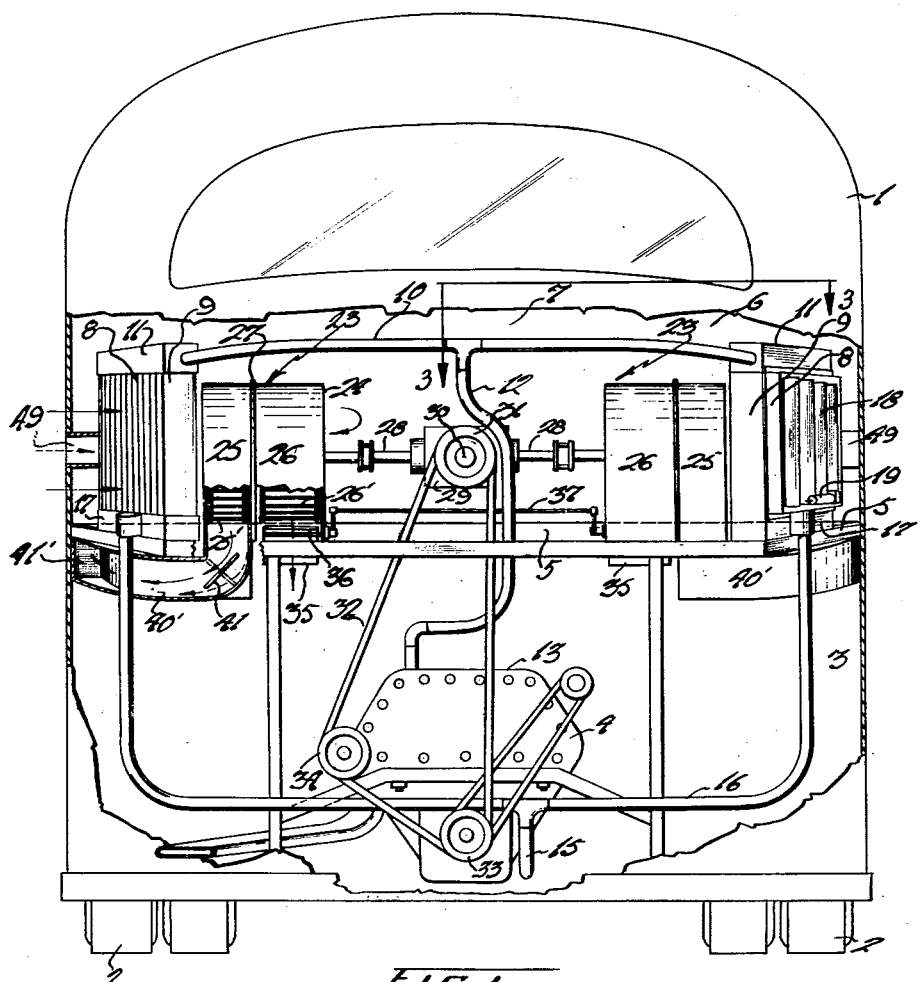
FIGURE 1 is a rear end view of a vehicle cut away to show the interior of the engine compartment.

Proceeding, therefore, to describe my invention in detail, reference should be made to the accompanying drawing and in particular to FIGURE 1 which shows the rear end 1 of a coach or bus supported upon tires 2 and containing an engine compartment 3, within which is situated a water cooled engine 4. A horizontal bulkhead 5 spans the compartment 3 and divides same into the lower engine compartment and an upper compartment 6 which is referred to in the claims as a further compartment. The bulkhead 5 extends from side to side of the vehicle and from the rear of the engine compartment to the forward bulkhead 7 thus making a sealed compartment which is air tight from the engine compartment so that fumes from the engine cannot pass into same.

Figure 2:
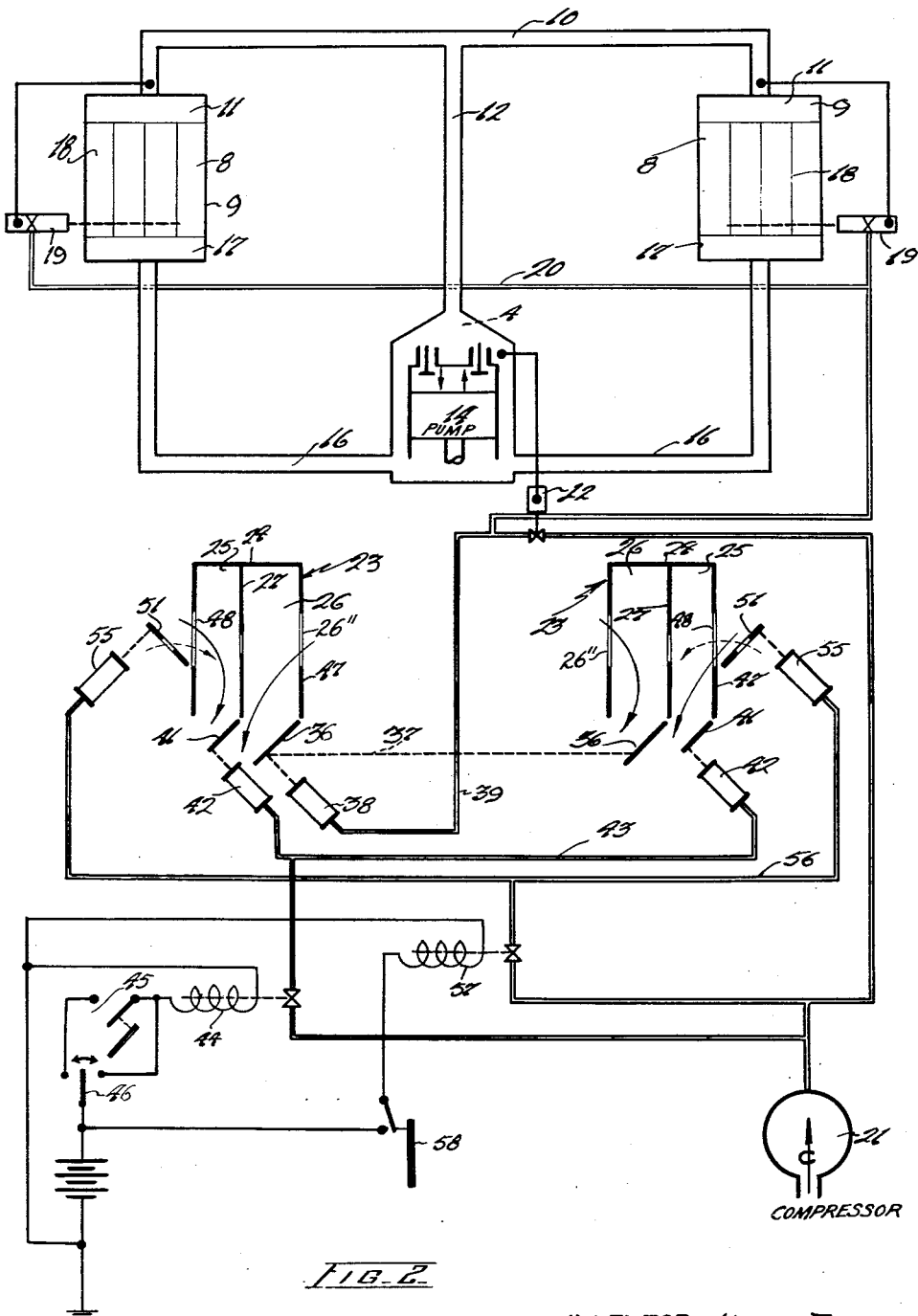
FIGURE 2 is a schematic diagram of my device shown in association with a schematic view of the cooling system.

Situated upon each side of the bulkhead 5 and diagonal to the longitudinal axis of the vehicle, is one of a pair of radiators 8 containing conventional radiator cores (not illustrated) and the surrounding casing 9. A conduit 10 extends between the upper header tank 11 of the two radiators, said conduit being fed by an intake conduit 12 which extends to the upper side 13 of the cylinder block of the engine 4 and conducts coolant from the engine block upwardly to the two radiators, conventional pump means (shown diagrammatically at 14 in FIGURE 2) being driven by the engine.

An intake conduit 15 extends from the base of the cylinder block and communicates with a cross conduit 16 which extends to the lower or base tanks 17 of each radiator.

The casing 9 of each radiator is provided with a set of movable shutters 18 on the outer face thereof, which shutters communicate exteriorally of the vehicle and selectively permit air to pass through the radiator cores. These shutters are controlled by pneumatic diaphragm valves 19 of conventional design which are connected via air lines 20 to a source of air pressure in the form of a compressor 21 also driven by the engine. A thermostat 22 in association with the engine block coolant, controls the operation of the diaphragm valves 19 and maintains the shutters closed (thus preventing air passing through the radiators) until the temperature of the engine coolant reaches the correct operating figure therefor, at which time the shutters open in order to maintain the coolant temperature within the engine within its normal operating range.

Inboard of each radiator and situated upon the horizontal bulkhead 5 is a tandem fan unit collectively designated 23. Each of these fan units comprises a cylindrical casing 24 divided into two sections 25 and 26 by means of a bulkhead or baffle 27. A transverse drive shaft 28 extends upon each side of a gear box 29 and into the housings 23, the aforementioned baffle 27 being centrally apertured to allow the shaft 28 to pass therethrough.

The gear box 29 is driven by means of a stub shaft 30 extending at right angles to shaft 28, said stub shaft carrying a belt pulley 31 around which extends a drive belt 32. The drive belt extends around the crank shaft pulley 33 of the engine and around a further pulley 34 mounted on the engine block, which is designed to drive the aforementioned compressor 21 (not illustrated in FIGURE 1).

Referring back to the cross shaft 28, the end thereof carries mounted thereon a pair of fans in tandem, said fans being identified by the reference character 26' and 25', each of these fans operating within the sections 26 and 25 respectively, of the fan housing 24. The fans are conventional in construction and are both rotated together by means of the shaft 28 and the fan 25' is designated as a heating and ventilating fan, whereas the fan 26' is designated as an engine cooling fan, air in both cases being drawn in axially in the usual way. In the case of fan 26', the air enters through the central aperture 26'' in the casing 26.

Referring first to the engine cooling fan 26', a duct 35 extends from the periphery of the casing 26 downwardly into the engine compartment 3, there being a duct from each section 26. These ducts are provided with hinged dampers 36 pivoted within the ducts and the two dampers are interconnected by means of linkage 37, so that movement of one damper initiates similar movement in the other damper.

A pneumatic diaphragm valve 38 controls the movement of these dampers and is connected via air conduit 39 to the compressor 21, the air supply being controlled by the aforementioned thermostat 22 within the engine coolant. In other words, the dampers 36 remain closed thus cutting off a flow of air to the engine compartment until such time as the engine coolant has reached the desired operating temperature of range, at which time the dampers open and permit air to be blown into the engine compartment to permit cooling of the engine through heat transfer in the radiator core.

Due to the baffle 27 within the fan housing 24, air which is drawn in through the radiator cores from the exterior is then drawn into the fan 26' from the upper or fan compartment 6.

The heating and ventilating fans 25', which are of a smaller capacity than the engine cooling fans 26', are connected by ducts extending from the periphery of the casing 25, to each side of the vehicle and then forwardly into the passenger compartment (not illustrated), conventional outlets being provided along the length thereof for the even distribution of the warmed air. These ducts are indicated by reference characters 40' in the accompanying drawing, and are each provided with filters 41' within the length thereof.

The movement of air through these ducts is also controlled by means of pivoted dampers 41 therewithin, the operation of said dampers also being by pneumatic diaphragm valves 42 of conventional construction. These valves are connected by air conduit 43 to the source of compressed air 21, the flow of air therethrough being controlled by a solenoid valve 44 which in turn is energized by automatic thermostatic switch 45 (situated in the passenger compartment) set at the predetermined temperature that is required within the passenger compartment (for example 70°–75° F.). This allows or cuts off air flow to the passenger compartment at the demand of the passenger compartment thermostatic switch.

However, an over-riding switch 46 is mounted in conjunction with this thermostat 45 and can be placed in manual or summer position thus maintaining the dampers 41 in the closed position under all circumstances, so that all of the cooling air flows into the engine compartment.

Figure 3:
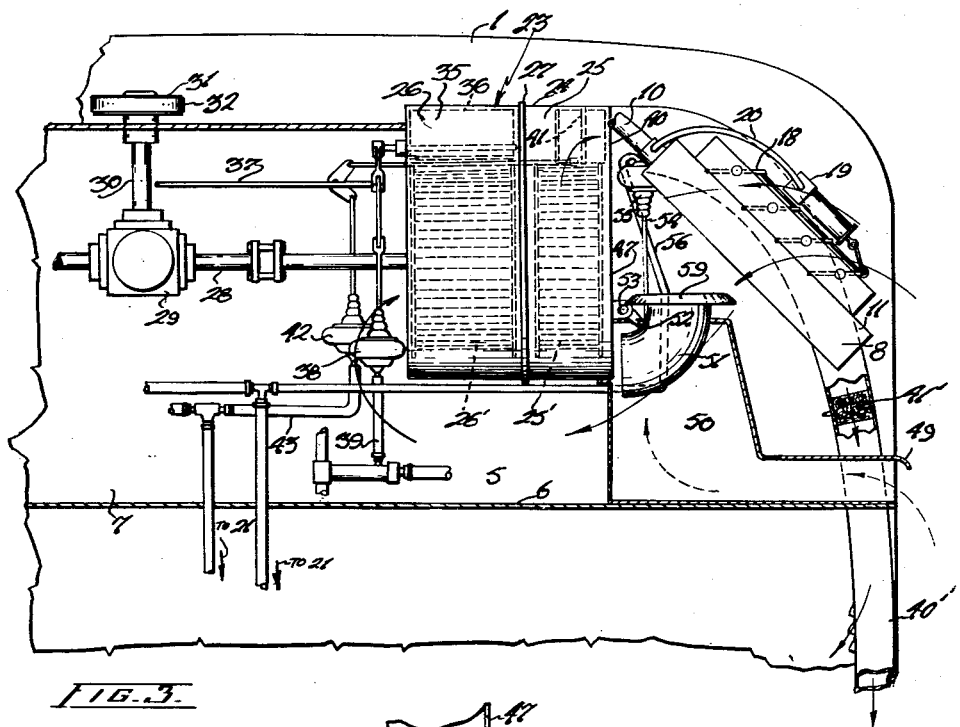

The outer face 47 of the heating and ventilating section 25 of the fan is apertured centrally as at 48 for the normal ingress therethrough of the air passing through the radiator cores. Fresh air intakes 49 are provided upon each side of the compartment 6 communicating with sealed casing 50. A right angled elbow conduit 51 is mounted for rotation through 90° upon an arm 52 pivoted upon a bracket 53 and controlled by means of a link 54 extending to a further air diaphragm valve 55. This valve is connected by air conduit 56 to the source of air pressure 21 and is controlled by means of solenoid valve 57, which in turn is controlled by means of thermostat 58 within the vehicle body. When the elbow 51, which is provided with a flange 59 upon one end thereof, is in the position shown in FIGURE 3, air is drawn in through the radiator cores and then into the heating and ventilating fan unit 25.

Figure 4:
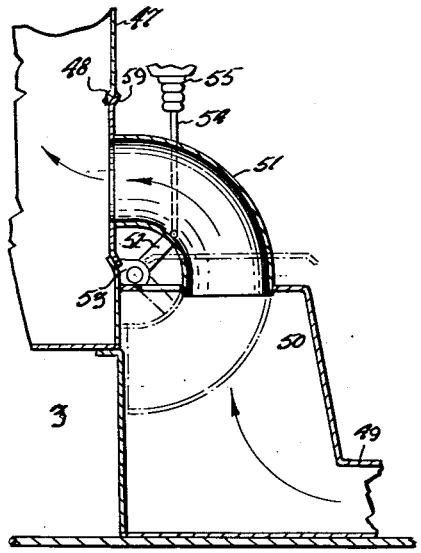
FIGURE 4 is an enlarged fragmentary portion of FIGURE 3 showing the right angled elbow in the closed position.

However, when the temperature within the passenger compartment of the vehicle reaches the temperature set on thermostat 58, the diaphragm valve 55 rotates the elbow 51 through 90° so that it takes up the position shown in FIGURE 4. It will be observed that the flange 59 now seats within the opening 48 within the fan casing thus closing off from the interior of this casing, any air coming in from the radiator cores (which air, is of course, warm). However, the position of the elbow now communicates fresh, cool air entering through 49 into casing 50, with the interior of the fan casing so that these fans 25' now commence to blow cool air into the duct 40 and then into the passenger compartment until such time as the temperature within the passenger compartment drops below a predetermined minimum as ascertained by means of interior thermostat 58. This is also provided so that if the dampers 18 of the radiator are closed, air still reaches the passenger compartment maintaining it in a pressurized condition which prevents drafts and the ingress of dust.

From the foregoing, it will be appreciated that this system assures a constant supply of fresh, warm air in winter to heat the entire vehicle thus preventing fogged up or frozen windows in sub-zero weather and that, furthermore, the engine reaches its operating temperature as soon as possible and maintains this temperature due to the shuttering action of the radiators and the control of the dampers 36.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

What I claim as my invention is:

1. An engine cooling and heating and ventilating unit for passenger vehicles which include an engine compartment sealed off from the passenger portion of the associated vehicle, a liquid cooled engine in said compartment and a source of compressed air operated by said engine; said unit comprising in combination a compartment adapted to be mounted in an engine compartment, said compartment being adapted to be sealed off with relation to an engine compartment, at least one liquid cooling radiator in said compartment connected for fluid circulation with an engine, the coolant area of said radiator being selectively open to the exterior, a tandem fan unit mounted in said compartment inboard of said radiator, drive means adapted to connect said tandem fan unit to an engine, said fan unit comprising a cylindrical housing, a baffle dividing said housing into two sections, an engine cooling fan in one of said sections and a heating and ventilating fan in the other of said sections, both fans being mounted on a common drive shaft, ducting adapted to extend from said one section to an engine compartment, further ducting adapted to extend from said other section to the interior of a vehicle, dampers in each of said ducting adapted to control air movement therethrough, means to control the movement of said dampers, and means associated with said other of said sections for selectively routing air either through said radiator to said heating and ventilating fan or from the exterior to said heating and ventilating fan, said last mentioned means including a sealed casing within said compartment, said sealed casing communicating with the exterior, a right angle elbow conduit mounted for rotation through substantially 90 degrees adjacent said sealed casing, one end of said elbow communicating with the interior of said casing, the other end of said elbow selectively engageable with the interior of said other section and thermostat means controlling the position of said elbow whereby air passes into said other section through said radiator when said other end of said elbow is out of communication with said other section, and air passes into said other section directly from the exterior via said sealed casing and said elbow, when said other end of said elbow is in communication with said other section.

2. The device according to claim 1 and means for selectively opening said radiator to the exterior including a set of thermostatically controlled shutters for said radiator mounted adjacent the outer face thereof.

3. The device according to claim 1 which includes a pair of radiators one on each side of said compartment and a pair of tandem fan units, one for each radiator.

4. The device according to claim 1 in which said means for controlling said dampers comprises pneumatic diaphragm valves and thermostats for controlling said valves, said diaphragm valves being adapted to be connected with a source of compressed air.

5. The device according to claim 2 which includes a pair of radiators one on each side of said compartment and a pair of tandem fan units, one for each radiator.

6. The device according to claim 2 in which said means for controlling said dampers comprises pneumatic diaphragm valves and thermostats for controlling said valves, said diaphragm valves being adapted to be connected with a source of compressed air.

7. The device according to claim 3 in which said means for controlling said dampers comprises pneumatic diaphragm valves and thermostats for controlling said valves said diaphragm valves being adapted to be connected with a source of compressed air.

References Cited in the file of this patent

UNITED STATES PATENTS

| | | |
|---|---|---|
| 1,938,846 | Masury et al. | Dec. 12, 1933 |
| 2,006,840 | Mueller | July 2, 1935 |
| 2,105,193 | Kysor | Jan. 11, 1938 |
| 2,241,753 | Whitlark | May 13, 1941 |
| 2,688,447 | Wilfert | Sept. 7, 1954 |
| 2,703,680 | Nallinger | Mar. 8, 1955 |
| 2,718,839 | Wilfert | Sept. 27, 1955 |

FOREIGN PATENTS

| | | |
|---|---|---|
| 1,071,000 | France | Feb. 20, 1954 |